(12) United States Patent
Pourpoint et al.

(10) Patent No.: US 11,779,882 B1
(45) Date of Patent: Oct. 10, 2023

(54) HYPERSONIC TEST FACILITY USING NITROUS OXIDE

(71) Applicant: Purdue Research Foundation, West Lafayette, IN (US)

(72) Inventors: Timothee L. Pourpoint, West Lafayette, IN (US); Utkarsh Pandey, Lafayette, IN (US); Jonathan Poggie, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 17/715,305

(22) Filed: Apr. 7, 2022

Related U.S. Application Data

(60) Provisional application No. 63/197,705, filed on Jun. 7, 2021.

(51) Int. Cl.
*B01D 53/86* (2006.01)

(52) U.S. Cl.
CPC ..... *B01D 53/8628* (2013.01); *B01D 53/8631* (2013.01)

(58) Field of Classification Search
CPC ............ B01D 53/8628; B01D 53/8631; B01D 53/8625; B01D 53/56; B01D 2251/00; B01D 2257/402; B01J 7/00; B01J 12/007; B01J 19/00; B01J 2219/00; G01D 21/00
See application file for complete search history.

(56) References Cited

FOREIGN PATENT DOCUMENTS

EP    1 022 047 A1 *  7/2000  ........... F28D 21/001

OTHER PUBLICATIONS

Craig et al., "Use of Nitrous Oxide for Obtaining High Stagnation Enthalpies in Shock Tunnels", American Institute of Aeronautics and Astronautics,5(12) 2271-2274 (1967).

* cited by examiner

*Primary Examiner* — Timothy C Vanoy
(74) *Attorney, Agent, or Firm* — Purdue Research Foundation

(57) ABSTRACT

A high enthalpy and low-cost Hypersonic Test Facility (HTF), which employs nitrous oxide to generate clean air-like gas; and a method of decomposing nitrous oxide in the presence of a catalyst in a catalytic decomposition chamber in a HTF.

16 Claims, 3 Drawing Sheets

Hypersonic Nitrous oxide tunnel (Nitrous oxide and nitrogen combined in a propellant tank upstream of a catalyst bed)

FIG.3(a) Saturation curve for 57% $N_2O$, 43% $N_2$     FIG.3(b) Operating regime for test facility FIG.4 (a) Laminar flame speed as a function of $N_2$ mole fraction.

FIG.4 (b) Quench diameter plotted on a log scale as a function of $N_2$ mole fraction.

Plumbing and instrumentation diagram of catalyst test rig

HYPERSONIC TEST FACILITY USING NITROUS OXIDE

GOVERNMENT RIGHTS

This invention was made with government support under contract number DE-NA0003525 awarded by the Department of Energy. The government has certain rights in the invention.

CROSS-REFERENCE TO RELATED APPLICATIONS

This application claims priority to U.S. Provisional Patent application No. 63/197,705, which was filed, Jun. 7, 2021, and which is incorporated herein by reference in its entirety.

TECHNICAL FIELD

The present disclosure provides Hypersonic Test Facility which utilizes a nitrous oxide to generate high enthalpy, clean, and an air-like gas. Further, the disclosure provides a method of decomposing the nitrous oxide in the Hypersonic Test Facility.

BACKGROUND

This section introduces aspects that may help facilitate a better understanding of the disclosure. Accordingly, these statements are to be read in this light and are not to be understood as admissions about what is or is not prior art.

Hypersonic flight has been of large interest in the aerospace community since the end of the second World War. Hypersonic test facilities (HTF) can simulate some thermal and fluid conditions of hypersonic flight, but even the best hypersonic tunnels (HT) face problems with flow uniformity, inadequate test times, contaminated flow, or cost. A true-enthalpy hypersonic tunnel can simulate the total enthalpy, stagnation pressure, Mach number, and one or more static thermodynamic conditions (such as pressure or temperature) that a vehicle would experience in flight.

The true-enthalpy HTFs currently known in the-art are operated by the National Aeronautics and Space Administration (NASA) and the Department of Defense (DOD). The HTF at the NASA Glenn Research Center and Arnold Engineering Development Complex (AEDC) use storage heaters to heat facility nitrogen or air to stagnation temperatures. However, HTFs powered by storage heaters consume a considerable amount of power. For instance, the HTF at NASA Glenn consumes 3 MW to power its storage heater.

Air vitiation is another method of generating high enthalpy working fluid in a hypersonic wind tunnel. The NASA Langley High Temperature Tunnel (HTT) The Aerodynamic and Propulsion Test Unit (APTU) at the AEDC are prime examples of this type of vitiated tunnel.

However, combustion products such as carbon dioxide, water, and other species produced by air vitiation methods can contaminate the operation of the tunnels and the measurements taken in the test section. A study conducted for the NASA Langley HTT showed that water condensation occurs in low total temperature regions of the nozzle and drives down the total pressure. The drop in total pressure can decrease the test section Mach number by 0.5 for all nozzles used in the HTT. Furthermore, increase in stagnation pressure and temperature can accelerate the condensation process downstream in the nozzle, causing an irreversible increase in static pressure in the test section.

Thus, most existing hypersonic tunnels generate high-temperature gas with heaters that requires substantial electrical power or air vitiation which can contaminate the test section with water or carbon dioxide.

The alternative to the existing methods is to use another reactant that generates high-enthalpy working gas for a continuous-flow HTF. Existing HTFs vitiate air by burning with hydrogen or a hydrocarbon fuel such as methane or butane. This creates combustion products such as carbon dioxide and water which can contaminate the test section. Use of nitrous oxide in HT is already known in the art. (see, e.g., Craig et. al., American Institute of Aeronautics and Astronautics, 5(12), 2271-2274 (1967).

However, the methods employed for decomposition of the nitrous oxide to generate air-like gas requires high temperature and pressure conditions.

Therefore, there is need to provide low-cost, true enthalpy HTF that resolves the issue of feeding nitrous oxide in the vapor phase at elevated temperature and pressures without risking thermal decomposition in the feed lines. There is also a need for true enthalpy HTF that can operate for long durations, on the order of minutes, at low electrical power and low cost per minute of runtime unlike the seconds or milliseconds as known in the art.

SUMMARY

The present disclosure provides a Hypersonic Test Facility (HTF), which utilizes a nitrous oxide ($N_2O$) to generate high enthalpy, clean, and an air-like gas. Further, the disclosure provides a method of decomposing a nitrous oxide in the HTF.

The disclosure provides a HTF which employs a nitrous oxide to generate a high enthalpy, clean, and air-like gas, comprises an assembly of:
a propellant tank configured to prepare a working gas comprising a binary mixture, which comprises $N_2O$ and $N_2$ gas, and to store the working gas in a vapor phase;
a decomposition catalytic chamber, which is operably connected to the propellant tank to receive the working gas and configured to carry out the decomposition of the working gas in the presence of a catalyst to obtain an air-like gas mixture;
a converging-diverging nozzle, which is operably connected to the decomposition catalytic chamber and a test chamber; and
a test chamber, which is configured to receive the air-like gas from the converging-diverging nozzle.

The disclosure further provides a method of decomposing a nitrous oxide in a HTF, wherein the method comprises:
a) allowing a working gas to enter into a catalytic decomposition chamber, wherein the working gas comprises a binary mixture which has been prepared by mixing $N_2O$ and nitrogen gas ($N_2$); and
b) decomposing the working gas comprising $N_2O$ and $N_2$ mixture in the catalytic decomposition chamber in the presence of a catalyst into nitrogen and oxygen to obtain an air-like gas mixture.

The method of decomposition of $N_2O$ is carried out in the HTF, wherein HTF comprises the assembly of a propellant tank (tank); the decomposition catalytic chamber; the converging-diverging nozzle and the test chamber as described above.

In one embodiment, the working gas comprises the binary mixture, which has been prepared by mixing $N_2O$ and $N_2$ gas. This binary mixture is prepared at a temperature about 240 K to about 500 K. The binary mixture is stored in the tank as a vapor at elevated pressure before it is entered into the decomposition chamber.

In one embodiment, the binary mixture comprises $N_2O$ and $N_2$ is in a ratio of about 50:50 mole % to 90:10 mole%.

In another embodiment, the binary mixture comprises $N_2O$ and $N_2$ is in a ratio of about 57:43 mole %.

Provided is the method of decomposing the working gas comprising $N_2O$ and $N_2$ in the catalytic decomposition chamber in the presence of the catalyst. The method allows for decomposition of $N_2O$ at lower mixture temperature and minimizes the production of nitric oxide as a byproduct.

In one embodiment, provided is the decomposition of the working gas comprising $N_2O$ and $N_2$ wherein the working gas generates the air-like gas at a temperature about 1300 K to about 1900 K and at a pressure between about 300 psia to about 9000 psia.

In one embodiment, provided is the catalyst used in the catalytic decomposition chamber wherein the catalyst is a heterogenous solid-phase.

In one embodiment, provided is the catalyst used in the catalytic decomposition chamber wherein the catalyst comprises a ceramic substrate, a high surface area support, and an active phase.

In one embodiment, provided is the catalyst wherein the ceramic substrate is a monolith substrate comprising α-phase alumina, cordierite, or mullite. The said substrate can be a honeycomb monolith.

In another embodiment, provided is the catalyst wherein the high surface area support comprises γ-phase alumina, hexaaluminate, or zirconia.

In another embodiment, provided is the catalyst wherein the active phase comprises the transition metal or the metal oxide. The transition metal or the metal oxide can be nickel oxide, cobalt oxide, or manganese oxide.

BRIEF DESCRIPTION OF THE DRAWINGS

The drawings described herein are for illustrative purposes only of selected embodiments and not all possible implementations and are not intended to limit the scope of the present disclosure.

FIG. 3(a) shows the saturation curve for initial 57/43 (mole%) mixture of $N_2O/N_2$. Accessible region for the tank (where mixture is vapor) shown in grey. FIG. 3(b) shows operating regime assuming vapor from grey region in FIG. 3(a) undergoes adiabatic decomposition. $T_i$ lines indicate decomposition (stagnation) temperature if mixture is preheated to $T_i$. Dynamic pressure q and altitude h plotted for reference.

FIG. 4(a) illustrates Laminar flame speed vs. $N_2$ mole fraction. FIG. 4(b) illustrates Quench diameter vs $N_2$ mole fraction. Inner diameters of standard ¼ inch and ⅜ inch tubes for reference.

DETAILED DESCRIPTION

Figure 1:
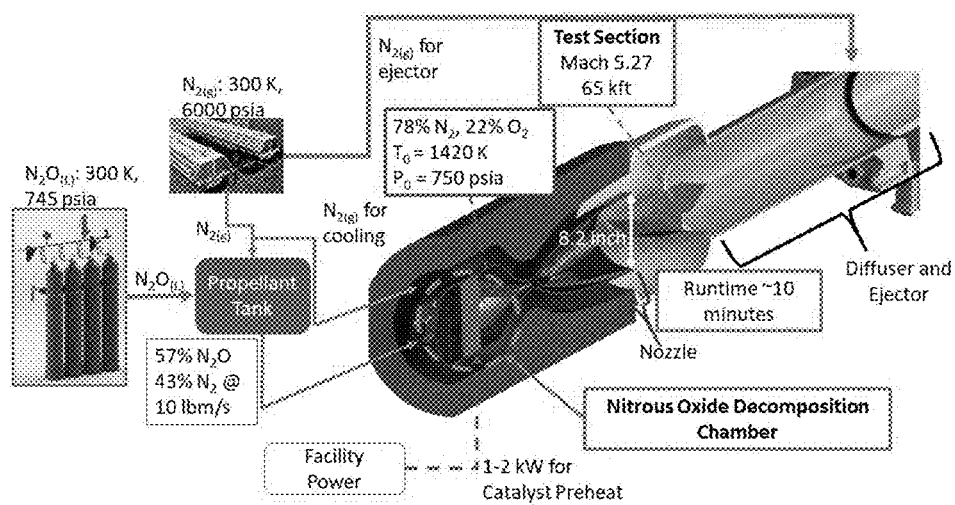
FIG. 1: shows the conceptual schematic of the hypersonic nitrous oxide tunnel using the catalytic decomposition chamber to decompose $N_2O$ wherein $N_2O$ from gas cylinders and facility $N_2$ combined in the propellant tank upstream of a catalyst bed.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

The term "about" can allow for a degree of variability in a value or range, for example, within 10%, within 5%, or within 1% of a stated value or of a stated limit of a range.

The term "substantially" can allow for a degree of variability in a value or range, for example, within 90%, within 95%, or within 99% of a stated value or of a stated limit of a range.

The term "K" is an abbreviation for degrees Kelvin, a unit of temperature. The temperature is calculated in "K" by adding 273.15 to the temperature in "° C." degrees centigrade.

The term "psi" is an abbreviation for pounds per square inch, a unit of pressure.

The term "psia" is an abbreviation for pounds per square inch of absolute pressure.

The term "psf" is an abbreviation for pounds per square foot, a unit of flight dynamic pressure.

The term "kft" is an abbreviation for thousands of feet, a unit of flight altitude. For example, 1 kft is 1000 feet.

The term "SLPM" is an abbreviation for standard liters per minute, a unit of volumetric flow rate of a gas.

The present disclosure provides a hypersonic test facility (HTF) which utilizes nitrous oxide to generate high enthalpy, clean, and an air-like gas. Further the disclosure provides a method of decomposing nitrous oxide in the HTF.

Nitrous oxide ($N_2O$) is a colorless gas that decomposes into nitrogen and oxygen. This decomposition results in a molar ration of 66% nitrogen and 34% of oxygen. Adiabatic decomposition of $N_2O$ can generate clean, air-like gas with no impurities at temperatures up to 1900 K. High stagnation temperature and a product species composition close to that of air, with no impurities, make $N_2O$ a desirable reactant for generating the working gas in the HTF.

A key enabling factor for the operation of a $N_2O$/nitrogen hypersonic tunnel stems from the fact that pure $N_2O$ remains in the liquid phase at room temperature at a pressure above 800 psia, whereas the $N_2O/N_2$ mixture can be stored in a run tank as a vapor at a pressure up to 2500 psia and fed into the decomposition catalytical chamber without the need of a heater to boil the mixture.

The disclosure provides the HTF which employs $N_2O$ to generate a high enthalpy, clean, and air-like gas, comprises an assembly of:

a propellant tank configured to prepare a working gas comprising a binary mixture, which comprises $N_2O$ and $N_2$ gas, and to store the working gas in a vapor phase;

a decomposition catalytic chamber, which is operably connected to the propellant tank to receive the working gas and configured to carry out the decomposition of the working gas in the presence of a catalyst to obtain an air-like gas mixture;

a converging-diverging nozzle, which is operably connected to the decomposition catalytic chamber and a test chamber; and a test chamber, which is configured to receive the air-like gas from the converging-diverging nozzle.

The disclosure further provides a method of decomposing $N_2O$ in a HTF, wherein the method comprises:

a) allowing a working gas to enter into a catalytic decomposition chamber, wherein the working gas comprises a binary mixture which has been prepared by mixing $N_2O$ and nitrogen gas ($N_2$); and b) decomposing the working gas comprising $N_2O$ and $N_2$ mixture in the catalytic decomposition chamber in the presence of a catalyst into nitrogen and oxygen to obtain an air-like gas mixture.

The air-like gas generated in (b) is then passed through a converging/diverging nozzle into the test section while reaching a static temperature and pressure, Mach number, dynamic pressure, and Reynolds number that are set a priori to simulate a particular flight condition.

The method of decomposition of $N_2O$ is carried out in the HTF, wherein HTF comprises the assembly of a propellant tank (tank) configured to prepare a working gas comprising a binary mixture which comprises $N_2O$ and $N_2$ and to store the same in vapor phase; a decomposition catalytic chamber which is operably connected to the propellant tank to receive the working gas and configured to carry out the decomposition of the working gas comprising $N_2O$ and $N_2$ in presence of a catalyst to obtain an air-like gas mixture; a converging-diverging nozzle which is operably connected to the decomposition catalytic chamber and a test chamber; and a test chamber, which is configured to receive the air-like gas from the converging-diverging nozzle to house a test article or test specimen for testing under hypersonic air flow.

It has been experimentally confirmed that $N_2O$ does not sustain the decomposition in the liquid phase. It is important to ensure $N_2O$ enters the decomposition chamber in the vapor phase.

Provided is a novel way to store $N_2O$ in the tank as a vapor by adding diluent such as $N_2$ gas and preparing the binary mixture. The binary mixture is prepared by mixing $N_2O$ with $N_2$ gas to obtain the working gas that allowed to enter into the decomposition chamber. High pressures in the tanks enable this gaseous binary mixture to be directly fed to the catalytic decomposition chamber and overcome the pressure drop in the catalyst. An alternative method would be to store $N_2O$ as a liquid in the tank and vaporize it with a heater before it is fed into the decomposition chamber. This method would require a significant amount of power to vaporize $N_2O$. This method would also present a safety concern as the nitrous oxide may thermally decompose as it flows through a heater.

In one embodiment, the binary mixture comprises $N_2O$ and $N_2$ gas is in a ratio of about 50:50 mole % to 90:10 mole%.

In another embodiment, the binary mixture comprises $N_2O$ and $N_2$ gas is in a ratio of about 57:43 mole %.

Figure 2:
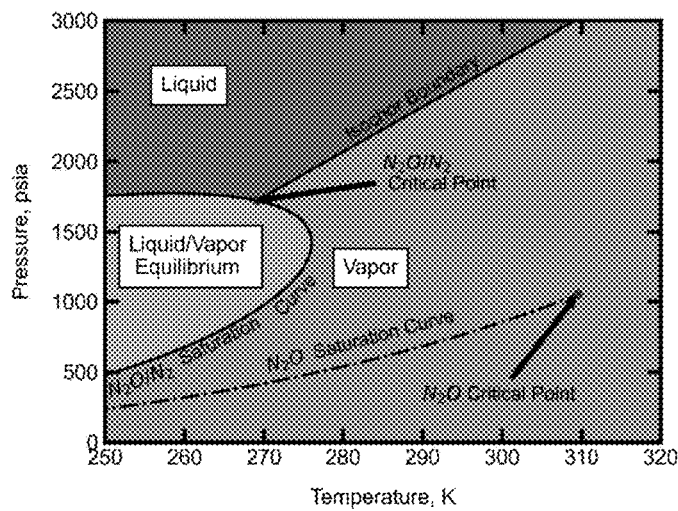
FIG. 2: shows a saturation curve, phases, and critical point of a 57/43 (mole %) nitrous oxide and nitrogen mixture ($N_2O/N_2$) mixture at various Isochor boundary separates the liquid phase from the vapor phase. Saturation curve and critical point of pure $N_2O$ shown for reference.

The binary mixture is stored in the tank at a temperature about 298 K and pressure about 1500 psia. The mixture remains in the vapor phase at this temperature, and there is no need to preheat the tank or add a heater upstream of the decomposition chamber. In fact, the tank could store this mixture at a pressure up to 2500 psia (close to the isochor phase boundary), and it will remain in the vapor phase in the tank. FIG. 2 illustrates the tank storing 57/43 (mole%) $N_2O/N_2$ mixture at about 298 K could be at up to about 2500 psia, close to the isochor phase boundary. At a pressures above about 2500 psia, the mixture will remain in the liquid phase.

Figure 4:
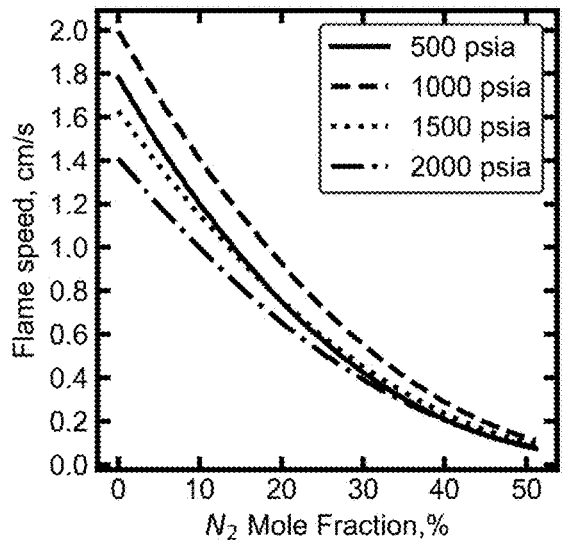
FIG. 4: shows $N_2O/N_2$ mixture laminar flame propagation calculations for pressures from about 14 psia to about 1500 psia.
Figure 4:
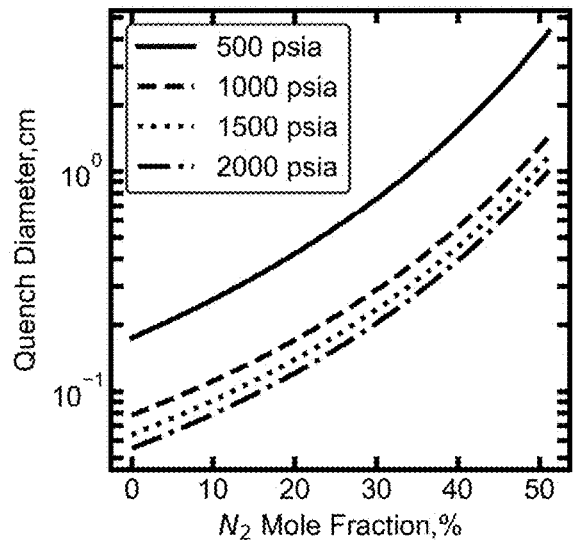

Another key advantage of, effectively, diluting $N_2O$ with $N_2$ gas is that nitrogen can increase the quenching diameter by two orders of magnitude compared to that of pure nitrous oxide. In practice, this dilution would quench any runaway thermal decomposition, making the mixture safe to handle, even at elevated pressures. Flame speed and quench diameter plots are shown in FIG. 4. Adding nitrogen to the mixture lowers the flame speed and increases the quench diameter. The quench diameter of the target mixture 57/43 mole % $N_2O/N_2$ is approximately 0.5 inch at 1500 psia.

The working gas comprising $N_2O$ and $N_2$ is then adiabatically decomposed such that the products of the mixture match the mole fraction of nitrogen and oxygen in air. The decomposition is carried out at temperature equivalent to the stagnation temperature that would be simulated in the HTF. $N_2O$ decomposes exothermically or endothermically following the global reactions. Exothermic reaction requires high inlet temperature to start the reaction. On the other hand, the endothermic reaction has a much lower activation energy but can produce nitric oxide as a byproduct.

Nitric oxide production is problematic in the HTF, as it contaminates the working gas such as the carbon dioxide or water contaminates vitiated systems. These thermal limitations are overcome by using the catalyst. The catalyst can accelerate the decomposition of $N_2O$ in the chamber of the HTF. The purpose of the catalyst is to lower the activation energy of the reaction, thereby allowing decomposition to commence at lower mixture temperatures. The catalyst maintains its activity level for multiple runs of minutes long duration before it needs to be replaced and selects the exothermic decomposition path over the nitric oxide producing endothermic path.

In one embodiment, provided is the decomposition of the working gas comprising the binary mixture of $N_2O$ and $N_2$ wherein the working gas generates air-like gas at a temperature about 1300 K to about 1900 K and at a pressure between about 300 psia to about 9000 psia. If the said binary mixture is prepared at a higher temperature, it can also be prepared at a higher pressure and the mixture will still remain in the vapor phase.

In one aspect, if the said binary mixture is prepared at temperature about 300 k the binary mixture can be prepared at a pressure up to about 2500 psi. Preparing the binary mixture at a pressure above about 2500 psia will result in the mixture transitioning from the vapor phase to the liquid phase across the isochor phase boundary.

In another aspect, if the said binary mixture is prepared at a temperature of 300 K, the binary mixture can be prepared at a pressure up to about 9000 psia. Preparing the binary mixture at a pressure above about 9000 psia will result in the mixture transitioning from the vapor phase to the liquid phase.

In one embodiment, provided is the catalyst used in the catalytic decomposition chamber wherein the catalyst is a solid-phase heterogenous catalyst.

In one embodiment, provided is the catalyst used in the catalytic decomposition chamber wherein the catalyst comprises a ceramic substrate, a high surface area support, and an active phase.

In one embodiment, provided is the catalyst wherein the ceramic substrate is a monolith substrate comprising α-phase alumina, cordierite, or mullite. The substrate can be a honeycomb monolith.

In another embodiment, provided is the catalyst wherein the high surface area support comprises γ-phase alumina, hexaaluminate, or zirconia.

In another embodiment, provided is the catalyst wherein the active phase comprises the transition metal or the metal oxide. The transition metal or the metal oxide can be nickel oxide, cobalt oxide or manganese oxide.

The catalyst is synthesized by a process comprising applying a support layer to the substrate followed by a thermal treatment; calcinating the support layer; and applying the active phase on the support layer followed by the thermal treatment of the active phase.

The solid-phase catalysts such as the metal or the metal oxide reacts with the gas-phase reactant is known as the "active phase". The high surface area support material beneath the active phase provides a larger surface area per unit mass of material and gives the active phase as much area as possible to engage in surface reactions. Beneath the high surface area support is the catalyst substrate which is the underlying structure of the full-scale catalytic reactor. The catalyst substrate can be the ceramic substrate. The active phase must bond well to the support, and the support must bond well to the substrate.

Figure 3:
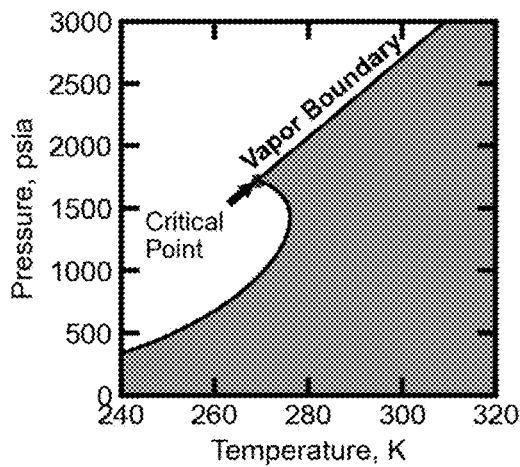
FIG. 3.
Figure 3:
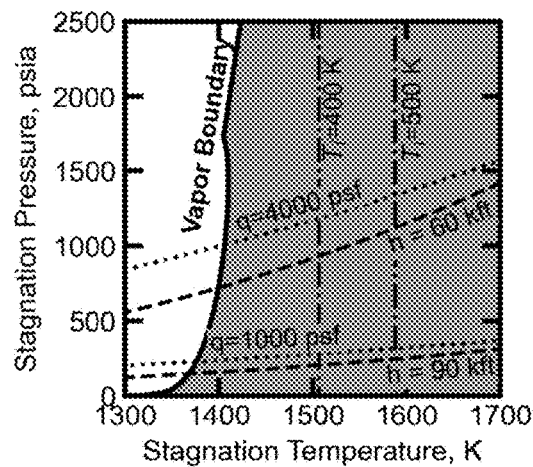

Two important flight conditions that must be replicated in a tunnel, especially for aero-structural or aero-propulsion testing, are the flight dynamic pressure q and the altitude h. Static conditions were calculated at altitude (temperature, pressure, and density). Flight velocity was calculated from density and dynamic pressure. Flight velocity and static temperature were used to calculate the flight Mach number. By assuming a perfect gas (constant specific heat capacity) and isentropic expansion of the gas from the decomposition chamber through the nozzle and into the test section, stagnation temperature and stagnation pressure were calculated in order to achieve each of these flight conditions in the tunnel. In FIG. 3($b$), the stagnation temperature and pressure are plotted to achieve these dynamic pressures and altitude conditions.

To illustrate the capability and low cost of HTF, we can consider a single flight condition (see FIG. 1.) with a stagnation pressure of 750 psia and a stagnation temperature of 1420 K upstream of a standard contraction/expansion nozzle assuming the $N_2O/N_2$ mixture enters the decomposition chamber at 300 K. Higher decomposition temperatures, and consequently higher Mach numbers can be achieved with increasing the inlet temperature of the $N_2O/N_2$ mixture, increasing the concentration of $N_2O$ in the mixture, or adding a small fraction of hydrogen fuel to the mixture to combust with the oxygen produced from $N_2O$ decomposition. For instance, preheating the inlet temperature of the 57/43 $N_2O/N_2$ mixture to 400 K increases the Mach number from 5.27 to 5.45. Adjusting the mixture composition from 57% $N_2O$ to 90% $N_2O$, while maintaining an inlet temperature of 300 K, raises the Mach number to 6.4 at a simulated altitude of 70 kft with a product gas composition of 68% $N_2$ and 30.7% $O_2$. The minimum simulated altitude must increase because increasing the $N_2O$ mole fraction puts an upper limit on the stagnation pressure as defined by the phase diagram of 90/10 $N_2O/N_2$ mixture. Maintaining a 300 K inlet temperature and a ratio of 57/43 of $N_2O/N_2$ but adding hydrogen such that its mole fraction in the mixture is 10%, raises the Mach number to 6.21 and results in a product gas composition to 75% $N_2$, 17% $O_2$, and 8% $H_2$.

For a 1X (10 lbm/s) total flow rate, the tunnel can operate at a runtime cost of $1630/minute based on the flow rate of $N_2O$ and the cost of $N_2O$ cylinders (with economies of scale expected with bulk delivery of $N_2O$ instead of gas cylinders). The run time of such a facility can then only be limited by the volume of $N_2O$ (and nitrogen) stored on site and the lifetime of the catalyst in the decomposition chamber.

FIG. 3 shows that the $N_2O/N_2$ mixture allows for the design of a hypersonic tunnel that simulates a range of altitudes from 60 kft to 90 kft and dynamic pressures from 1000 psf to 4000 psf. The actual upper bounds on stagnation temperature and stagnation pressure of this type of system depend on facility constraints. The pressure constraint depends on the maximum pressure a tank can hold along with any pressure drops through the feed system from regulators, feed lines, valves, or other components. The temperature constraint depends on the energy available to preheat the $N_2O/N_2$ mixture (either in the tank or with a downstream heater) as well as any temperature constraints on the materials used to construct the tank or the feed lines.

When compared to current hypersonic test facilities, a nitrous oxide HTF of present disclosure can provide high enthalpy, clean, air-like gas at low electrical power and low cost per minute of runtime. The $N_2O$ tunnel can make use of the favorable properties of a 57/43 (mole %) mixture of $N_2O$ with $N_2$ to generate, upon exothermic decomposition, a gas mixture of 78/22 (mole %) mixture of nitrogen and oxygen (a.k.a. clean air) at a minimum temperature of 1420 K. With careful control of the ambient pressure in the test section, flight envelope analysis shows that Mach 5.3 is achievable at simulated altitudes as low as 22 kft. Mach numbers of 6 or greater are possible by increasing the stagnation temperature in the test section. Flight envelope analysis showed that flight speeds in the Mach 5-6 range can be simulated at altitudes of 35 kft to 65 kft in such a test facility.

Experimental Section

A. Preparation of Catalyst

Alumina-based catalysts were prepared using a sol-gel method and analyzed with scanning electron microscopy and elemental dispersive X-ray spectroscopy. Specifically, the catalysts were prepared by applying a washcoat layer to an alumina substrate providing more bonding sites for the active phase metal oxide onto the catalyst surface. After calcinating the wash coated pieces for several hours at temperatures above 800° C., the pieces were dipped into aqueous solutions of the active phase metal to impregnate the metal onto the washcoat layer. After oxidizing the metal with another round of calcination, the surfaces were imaged with a scanning-electron microscope (SEM) and energy-dispersive x-ray spectroscopy (EDS) was used to determine elemental composition.

Alumina catalysts in the form of tubes were fabricated according to the washcoating and active phase deposition method. Non-porous tubes composed of $\alpha\text{-}Al_2O_3$ procured from McMaster-Carr@ were cleaned with isopropyl alcohol, dried under nitrogen flow, and weighed. Teflon@ tape was wrapped the outer surface of the tubes to ensure the primer and washcoat only deposited onto the inner walls. The acoustic mixer mixed a primer solution of 10% by weight DISPAL@ T25N4 in distilled water at 50% intensity for 20 minutes. The tubes were submerged in the primer solution for 30 seconds and then dried for 30 minutes. The tubes, still wrapped in Teflon@ tape, were dipped into a washcoat solution consisting of 7.19 g of $\gamma\text{-}Al_2O_3$ nanopowder dissolved in 23.97 g $HNO_3$ solution at 4.25% (w/w) concentration (mixed in the acoustic mixer at 50% intensity for 30 minutes). The tubes were submerged in the washcoat solution for one hour. Excess solution was blown off with nitrogen gas and the tubes "flash-dried" in a bench-top furnace at 230° C. for ten minutes. The washcoat weight loading after "flash-drying" was below the desired 1 mg/cm², so the washcoat deposition was repeated with another "flash-dry" at 110° C. for ten minutes. The weight loading of the washcoat was satisfactory after the second coating, so the tubes calcinated at 900° C. for ten hours. The furnace ramped to 900° C. at a rate of 0.5° C/minute and ramped down to room temperature at a rate of 1° C/minute.

The washcoated tubes were weighed after calcination and then submerged into a 10% metal by weight solution of nickel nitrate or cobalt nitrate for one hour. Excess solution was blown off with nitrogen gas and then the tubes calcinated at a temperature of 550° C. for three hours with a heating ramp rate of 0.5° C/minute. The program concluded after the three-hour calcination, and the pieces cooled naturally to room temperature in the furnace. Table 1 gives the washcoat and active phase weight loadings of the cobalt and nickel catalysts.

TABLE 1 washcoat and active phase weight loading of samples tested with nitrous oxide.

| Sample | Active Phase Metal | Washcoat weight loading after Calcination (mg/cm$^2$) | Active Phase weight loading (mg/cm$^2$) | Mass of washcoat + active phase (g) |
|---|---|---|---|---|
| 1 | Cobalt | 1.368 | 0.3180 | 0.03075 |
| 2 | Nickel | 1.264 | 0.1974 | 0.02665 |

B. Decomposition of nitrous oxide

Figure 5:
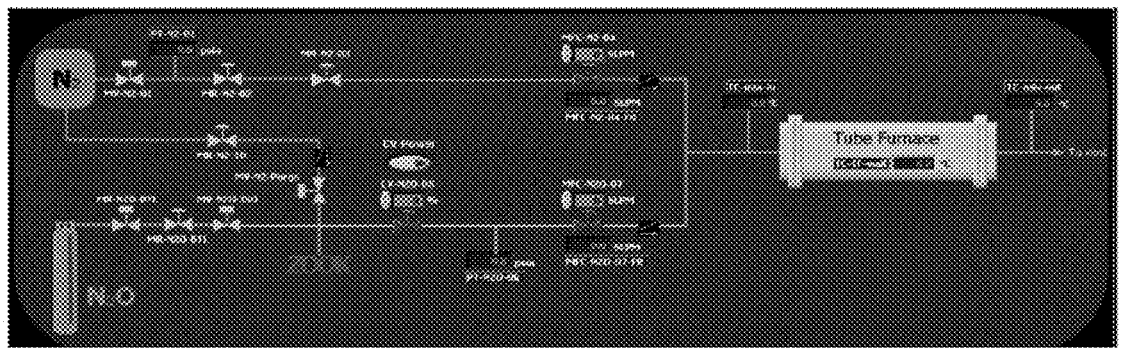
FIG. 5: shows plumbing and instrumentation diagram of catalyst test rig. Consists of $N_2$ and $N_2O$ supplies, tube furnace to heat catalyst, flow controllers to control gas flow rate, and temperature and pressure sensors.

Nitrous oxide flowed from a Type K cylinder through a manual regulator into a control valve. During test operations, the nitrous oxide regulator was loaded to 100 psia with the downstream control valve fully closed. The control valve opened in increments of 10% until the nitrous oxide filled the line between the regulator and the mass flow controller, after which the valve opened fully. The slow fill procedure reduced the risk of decomposition from adiabatic compression of the nitrous oxide in the control valve, and all personnel remained in the control room of the facility when the valve opened. Nitrogen gas from the bulk nitrogen supply flowed to the nitrogen mass flow controller and to the nitrous oxide purge line. The nitrogen and nitrous oxide flow controllers were mid-range flow controllers supplied by Alicat@ each for a maximum flow rate of 2 standard liters per minute (SLPM). Two-micron filters upstream of the flow controllers prevented the entry of particles into the controllers, and check valves downstream of the flow controllers prevented backflow of gas. The nitrous oxide and nitrogen gases mixed in a T-section and fed into the catalyst inside the tube furnace. Thermocouples monitored gas temperature upstream and downstream of the tube furnace, and a thermocouple placed inside the tube furnace monitored the temperature of the furnace. FIG. 5 shows a picture of the setup with labels for important components.

The catalyst tube with weight loading given in Table 1 inserted in the tube furnace at the start of the test. About 0.25 SLPM of nitrogen gas flowed through the catalyst as the furnace ramped to its first set point of 500° C. After the furnace reached its set point and once the outlet temperature rose by a rate of no more than 0.5 to 1° C/minute, the system was determined to be operating at quasi-steady state. At this point, the rise in temperature of the gas was recorded to determine the heat transferred to the gas by the furnace at a flow rate of 0.5 SLPM. The nitrous oxide and nitrogen flow rates were set to 0.25 SLPM each. Once the outlet temperature increased at a rate less than 1° C/minute, the system was determined to be operating at quasi-steady state. The nitrous oxide flow was set to 0 SLPM, and the nitrogen flow was increased to 1 SLPM to repeat the cycle. The nitrous oxide flow was set to 0 SLPM, and the nitrogen flow was increased to 1 SLPM to repeat the cycle. Table 2 gives the set of flow rates tested for a single catalyst at a single furnace set point temperature. These flow rates were repeated with the furnace at a set point of 600° C. and for the nickel oxide catalyst with weight loading given in Table 1.

TABLE 2

Nitrous oxide and nitrogen flow rates for a single catalyst at a single furnace set point temperature.

| $N_2O$ Flow Rate, SLPM | $N_2$ Flow Rate, SLPM |
|---|---|
| 0 | 0.5 |
| 0.25 | 0.25 |
| 0 | 1 |
| 0.5 | 0.5 |
| 0 | 1.5 |
| 0.75 | 0.75 |
| 0 | 2 |
| 1 | 1 |

Overall, the present disclosure provides low-cost HTF by using $N_2O$. Further, the present disclosure provides the method of decomposing the working gas comprising the binary mixture which comprises $N_2O$ and $N_2$ which provides a high temperature gas with air-like chemical composition at low cost. $N_2$ gas used to obtain the binary mixture allows for mixture to remain in vapor phase at high pressures and improves system safety by reducing the risk of thermal decomposition in feed lines. The catalyst lowers activation energy in decomposition chamber and reduces formation of nitric oxide.

While the present disclosure has been described with reference to certain embodiments, it will be apparent to those of ordinary skill in the art that other embodiments and implementations are possible that are within the scope of the present disclosure without departing from the spirit and scope of the present disclosure. Thus, the implementations should not be limited to the particular limitations described. Other implementations may be possible. It is therefore intended that the foregoing detailed description be regarded as illustrative rather than limiting. Thus, this disclosure is limited only by the following claims.

We claim:

1. A method of decomposing a nitrous oxide ($N_2O$) in a hypersonic test facility (HTF), which method comprises:
   a) allowing a working gas to enter into a catalytic decomposition chamber, wherein the working gas comprises a binary mixture which has been prepared by mixing $N_2O$ and nitrogen gas ($N_2$); and
   b) decomposing the working gas comprising $N_2O$ and $N_2$ mixture in the catalytic decomposition chamber in the presence of a catalyst into a nitrogen and oxygen gas mixture.

2. The method of claim 1, wherein the HTF comprises an assembly of a propellant tank, the catalytic decomposition chamber, a converging-driving nozzle, and a test chamber which employs $N_2O$ to generate a high enthalpy nitrogen and oxygen gas mixture.

3. The method of claim 1, wherein the binary mixture comprising $N_2O$ and $N_2$ is in a ratio of about 50:50 mole % to about 90:10 mole %.

4. The method of claim 3, wherein the binary mixture comprising $N_2O$ and $N_2$ is in a ratio of about 57:43 mole %.

5. The method of claim 1, wherein the binary mixture comprising $N_2O$ and $N_2$ is prepared at a temperature between about 240 K to about 500 K.

6. The method of claim 1, wherein the binary mixture comprising $N_2O$ and $N_2$ is prepared at a pressure between about 300 psia to about 9000 psia.

7. The method of claim 1, wherein the catalyst in (b) is a heterogenous solid-phase catalyst.

8. The method of claim 7, wherein the heterogenous solid-phase catalyst comprises a ceramic substrate, a washcoat support, and an active phase.

9. The method of claim 8, wherein the ceramic substrate is a monolith substrate comprising α-phase alumina, cordierite, or mullite.

10. The method of claim 8, wherein the washcoat support comprises a γ-phase alumina, a hexaaluminate, or a zirconia.

11. The method of claim 8, wherein the active phase comprises a transition metal or a metal oxide.

12. The method of claim 11, wherein the transition metal or the metal oxide can be nickel oxide, cobalt oxide or manganese oxide.

13. The method of claim 1, wherein the decomposition of the working gas generates the nitrogen and oxygen gas mixture at a temperature from about 1300 K to about 1900 K.

14. The method of claim 1, wherein the decomposition of the working gas generates the nitrogen and oxygen gas mixture at a pressure between about 300 psia to about 9000 psia.

15. The method of claim 1, wherein the binary mixture comprising $N_2O$ and $N_2$ stored in the tank and transferred into the decomposition chamber is in vapor phase.

16. A hypersonic test facility (HTF) which employs a nitrous oxide to generate a high enthalpy nitrogen and oxygen gas mixture, wherein the HTF comprises an assembly of:

a propellant tank configured to prepare a working gas comprising a binary mixture, which comprises $N_2O$ and $N_2$ gas, and to store the working gas in a vapor phase;

a decomposition catalytic chamber, which is operably connected to the propellant tank to receive the working gas and configured to carry out the decomposition of the working gas in the presence of a catalyst to obtain nitrogen and oxygen gas mixture;

a converging-diverging nozzle, which is operably connected to the decomposition catalytic chamber and a test chamber; and a test chamber, which is configured to receive the nitrogen and oxygen gas mixture from the converging-diverging nozzle.

* * * * *